United States Patent
Peggs

[11] 3,897,863
[45] Aug. 5, 1975

[54] CART RECEPTION AND REWARD MECHANISM

[75] Inventor: Albert Leland Peggs, Duarte, Calif.

[73] Assignee: Cart Saver, Inc., San Francisco, Calif.

[22] Filed: June 27, 1974

[21] Appl. No.: 483,651

[52] U.S. Cl. .............................................. 194/4 R
[51] Int. Cl. .............................................. G07f 1/06
[58] Field of Search .......... 194/4 R, 4 B, 4 C, 4 D, 194/4 E, 4 F, DIG. 23, DIG. 24; 221/194

[56] References Cited
UNITED STATES PATENTS

| | | | |
|---|---|---|---|
| 2,753,970 | 7/1956 | Breeler | 194/4 F |
| 2,818,955 | 1/1958 | Stackhouse | 194/4 F |
| 3,165,189 | 1/1965 | Easterday | 221/199 X |
| 3,194,377 | 7/1965 | Fischbach et al. | 194/4 R |
| 3,754,630 | 8/1973 | Gilker | 194/4 C |

Primary Examiner—Stanley H. Tollberg
Assistant Examiner—David A. Scherbel
Attorney, Agent, or Firm—Donald D. Mon

[57] ABSTRACT

A mechanism for receiving a cart such as a shopping cart and issuing a reward as a consequence of the return of the cart. The mechanism includes a platform defining a path along which the cart is rolled while being returned. An unlatching plunger, a reward plunger, and a latching plunger project above the platform, sequentially to be depressed in that order by a wheel or wheels of the cart respectively to permit the actuation, to actuate, and to prevent the actuation of an actuating rod that causes an issuing device to issue the reward. A turnstile receives the cart and prevents it from backing out of the mechanism, and also limits the height by which the cart can be lifted when the respective wheel contacts the reward plunger, thereby deterring the issuance of multiple rewards upon the return of a single cart. In the preferred embodiment, the unlatching plunger and the reward plunger are contacted by different wheels, and the end of at least the reward plunger is sharpened, both features tending to make more difficult the unauthorized manual actuation of the mechanism either with or without a cart in place.

23 Claims, 11 Drawing Figures

PATENTED AUG 5 1975　　　　　　　　　　　　　　　　　　3,897,863
SHEET　　　1
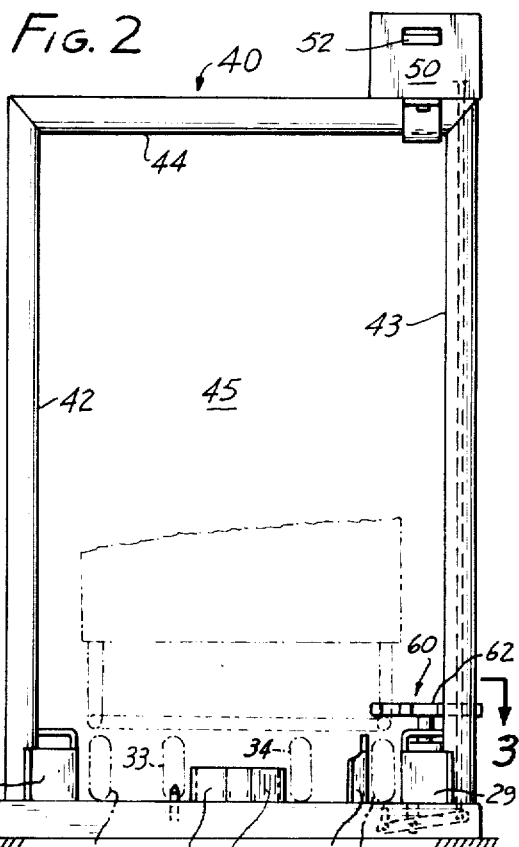
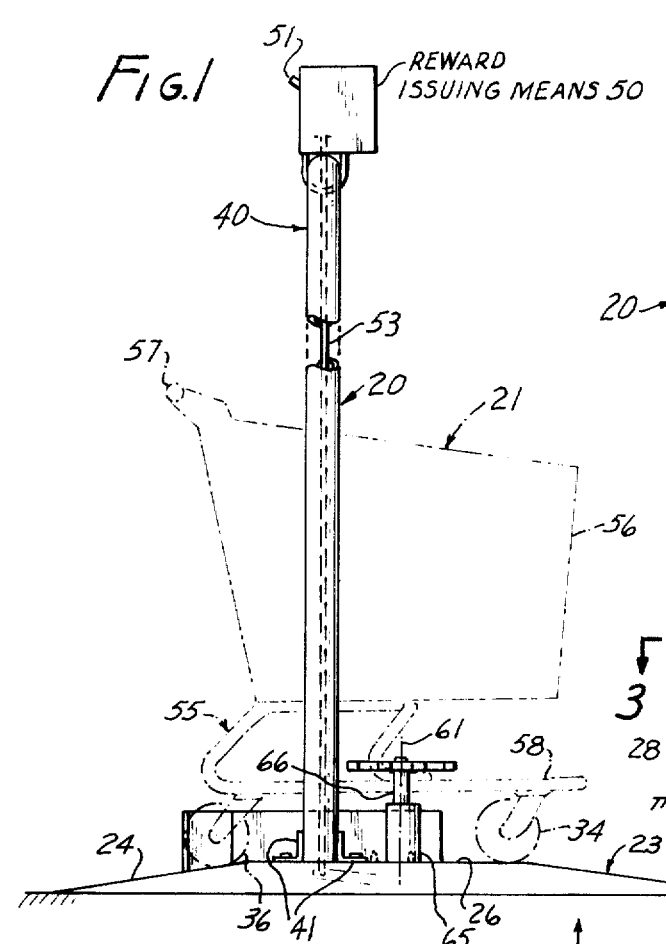
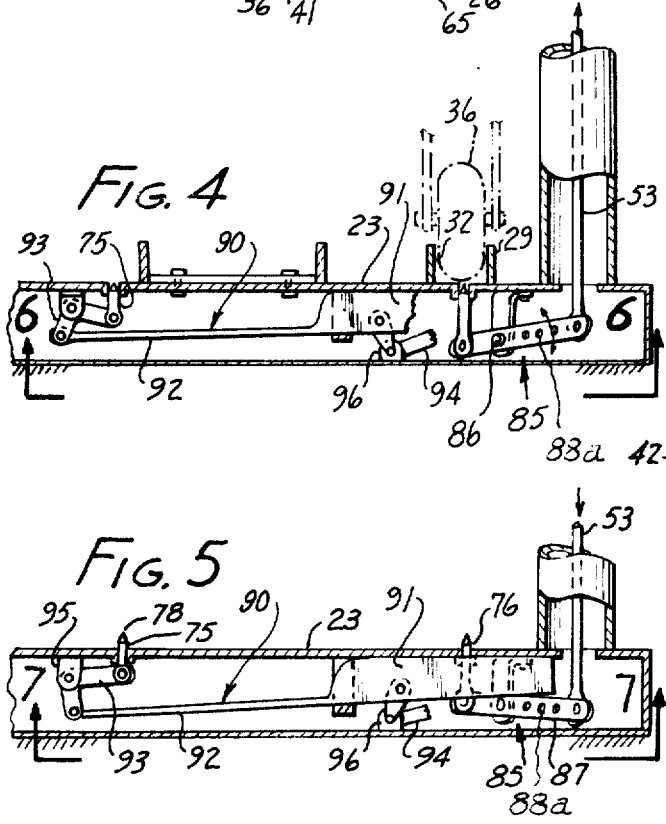
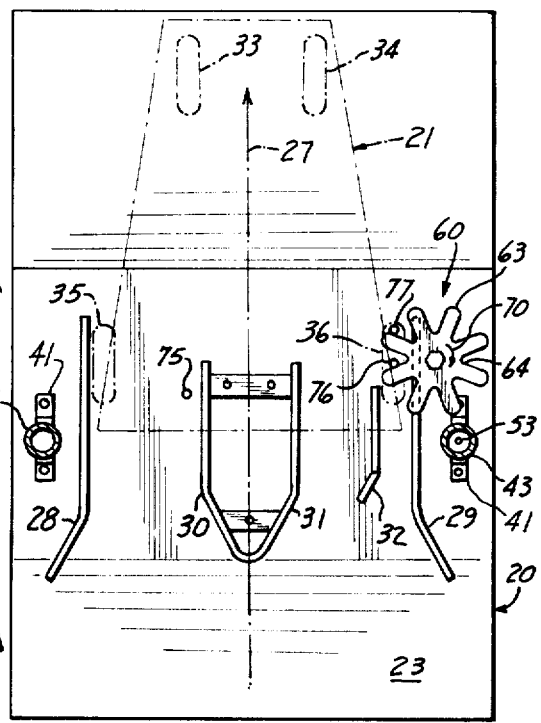

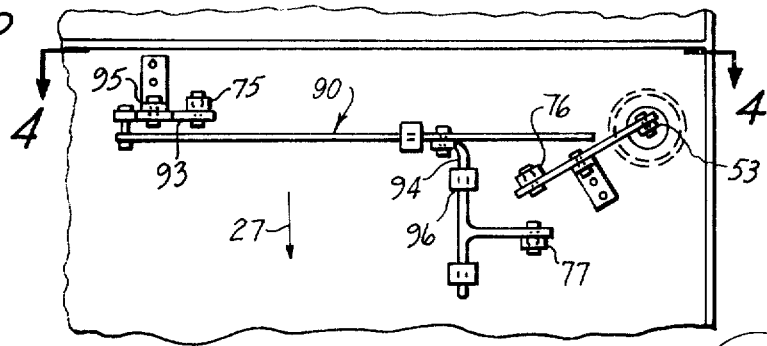
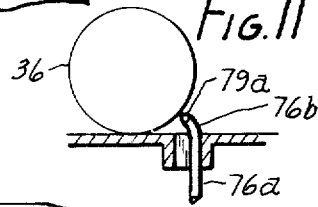
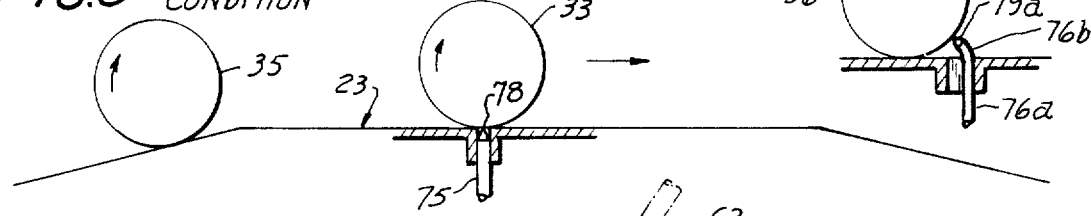
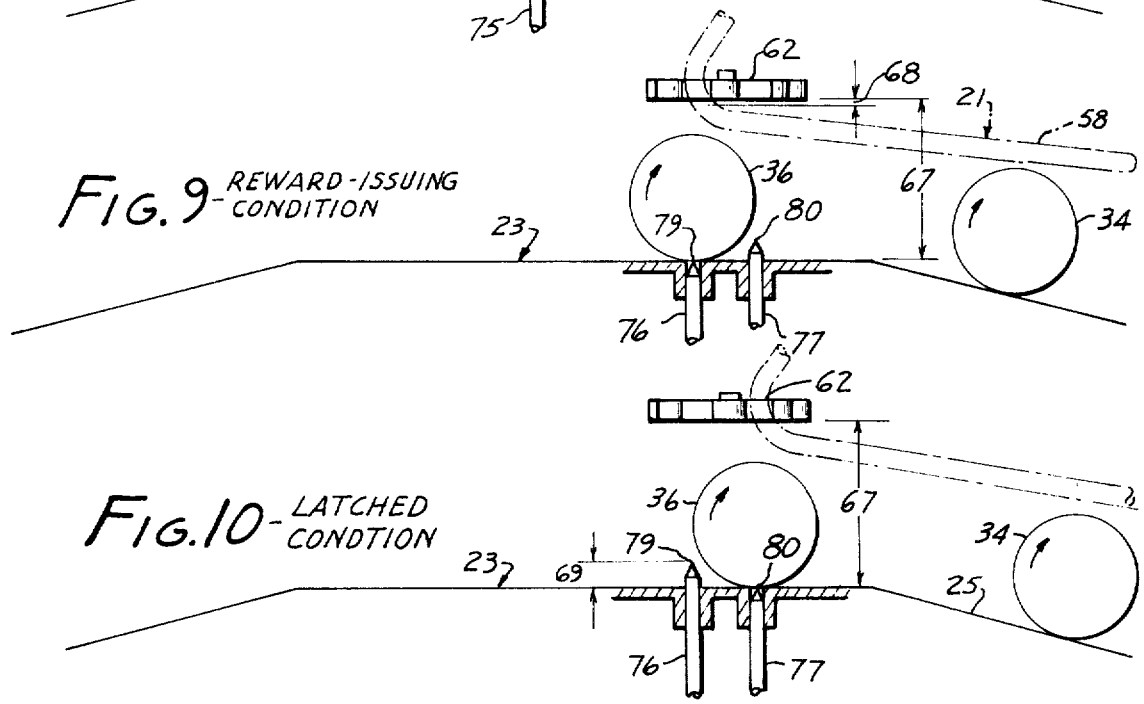
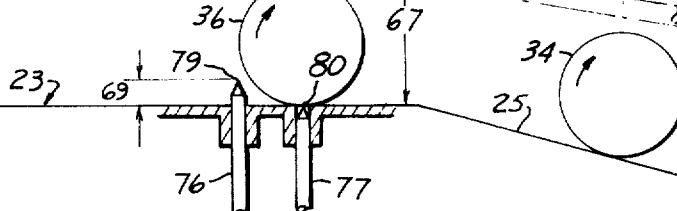
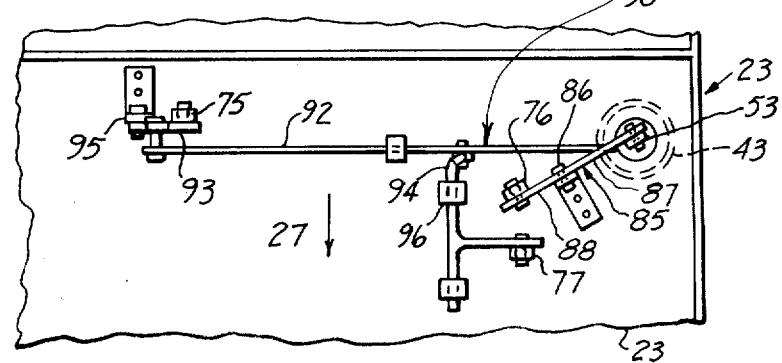

CART RECEPTION AND REWARD MECHANISM

This invention relates to the recovery of carts, for example shopping carts.

Because they are so convenient, shopping carts are often removed from the market area by persons who use them to carry their groceries home. Frequently these persons abandon the carts near their homes and do not return them to the market. As a consequence, many carts are lost to the markets, and the markets must search the neighborhood to get their property back.

Also, shoppers who have brought their automobile to the store's parking lot unload the cart's contents into their automobile, and often leave the cart wherever the automobile was parked. Store personnel, whose labor is becoming increasingly costly, must then go out into the parking lot, collect the carts, and return them to the inside of the store for re-use.

In addition, carts left in a parking lot can coast into cars and damage them. Also, they can be damaged by cars and then in use the damaged cart is frequently unstable and tends to tip over when pushed with a load aboard. These situations all can give rise to liability claims against the store.

Substantial capital expenditures can be justified in order to encourage the return of carts to the store, and even to discourage them from being taken from the store at all. A suitable device will not only encourage the shopper to return the cart to some point selected by the store itself (or not to remove it at all), but will encourage others to return carts which are left in the lot, or which are found in the neighborhood. Trading stamps are an example of a reward, and these have been found suitable to encourage a high percentage of return.

It is an object of this invention to provide a mechanism that issues a reward as a consequence of the return of a cart. Devices of this type are already known, for example those shown in the following U.S. Pat. Nos. Breeler 2,753,970, Stackhouse 2,818,955, Easterday 3,165,189, Kuhns 3,283,868. The prior art devices are, in general, rather complicated and are troublesome to maintain and costly to purchase. Optimum devices should be relatively inexpensive, and sufficiently rugged and uncomplicated that they can be run with little maintenance and repair, and can be left exposed to the elements in a parking lot. Therefore a device of elegant simplicity is called for. However, while making the device simple, it is still necessary for it to deter the issuance of multiple rewards or "jackpotting" by clever manipulation, because it may be desirable to place it in a relatively unsupervised place. The mechanism of this invention meets the foregoing objectives.

A mechanism according to this invention comprises a platform defining a path along which a cart is rolled while it is being returned. An unlatching plunger, a reward plunger, and a latching plunger project above the platform, sequentially to be depressed in that order by a wheel or wheels of the cart, respectively to permit the actuation, to actuate, and to prevent the actuation of an actuating rod that causes an issuing device to issue a reward. A turnstile receives the cart and prevents it from backing out of the mechanism. It also limits the height by which the cart can be lifted when the respective wheel presses down on the reward plunger, thereby detering the issuance of multiple rewards upon the return of a single cart.

According to preferred but optional features of the invention, the unlatching plunger and reward plunger are contacted by different wheels, and the tip end of at least the reward plunger is sharpened, both features tending to make more difficult the unauthorized manual actuation of the mechanism either with or without a cart in place.

The above and other features of the invention will be fully understood from the following detailed description and the accompanying drawings, in which:

FIG. 1 is a side elevation, partly in cutaway cross-section, showing the presently preferred embodiment and the best known mode of practising the invention;

FIG. 2 is a left hand view of FIG. 1;

FIG. 3 is a top view of FIG. 1 with certain features of a cart superimposed on it;

FIG. 4 is a fragmentary cross-section taken at line 4—4 in FIG. 6, showing part of the mechanism in the reward-issuing condition corresponding to FIG. 9;

FIG. 5 is a view similar to FIG. 4 showing part of the mechanism in the latched condition as the consequence of the actuation illustrated in FIG. 10;

FIGS. 6 and 7 are fragmentary bottom views of FIG. 1 showing part of the mechanism in the conditions of FIGS. 4 and 9, and of FIGS. 5 and 10, respectively;

FIGS. 8, 9 and 10 are schematic views showing portions of the mechanism in the unlatching, reward issuing, and latching conditions, and FIG. 11 is a fragmentary cross-section showing an alternate construction for the reward plunger.

A mechanism 20 for receiving a cart 21 is shown in FIG. 1. It is adapted to be placed upon the ground 22, and includes a platform 23. The platform includes entrance and exit ramps 24, 25, respectively, and a central plateau 26. A path 27 (FIG. 3), along which the cart passes, is defined on the platform.

Outer guides 28, 29, inner guides 30, 31, and a restraint guide 32 are attached to the platform to guide the wheels of the cart. Front wheels 33, 34 and rear wheels 35, 36 are shown in FIG. 3. In conventional carts, the front wheels are closer together than the rear wheels so that each set has a different straddle. The front wheels are located substantially ahead of the rear wheels to give stability to the cart. The front wheels straddle the inner guides 30 and 31, and the rear wheels are restrained by the outer guides 28 and 29. In addition, rear wheel 36 passes between restraint guide 32 and outer guide 29.

A framework 40 is attached to the platform by means of flanged members 41 and includes a pair of posts 42, 43 and a crossbar 44. This forms a portal 45 through which the carts are passed. This portal may be installed in the wall of a building, or it may be an end attachment for a fence or other enclosure, if desired.

The framework supports a reward-issuing means 50 which is adapted to issue a reward, such as a trading stamp 51, through a slot 52 in one of its faces. This reward-issuing means is preferably one which can be actuated by a push-pull movement of an actuating rod. A suitable device which can be adapted for this purpose is shown in Walker U.S. Pat. No. 3,528,594, issued Sept. 15, 1970. In the device as illustrated in the patent, a dial is used to provide the actuating motion. It is possible to adapt the end of an actuating rod 53 which passes upwardly inside post 43 (the post being a hollow pipe) to be connected to the Walker device by means not shown (such as a pawl-ratchet arrangement) so that its actuation will cause the device to issue one stamp. A specific adaptation will be evident to persons skilled in the art. It constitutes means whereby the actuating rod will move the dial or dial-actuated mechanism of the Walker patent to issue one stamp. Other suitable ratchet-type ticket delivery devices may readily be substituted for the Walker device, so long as a single actuating movement of actuating rod 53 causes the dispensing of a single stamp (or of any other predetermined number of stamps). It is the object of the mechanism to cause the actuating rod to make an actuating movement as the consequence of the movement of one cart along the path and through the portal, and to deter persons from manipulating the cart or the elements of the system to issue more than a predetermined number of stamps (perhaps one) as the consequence of returning only a single cart. Rewards other than parts of a strip may be dispensed. For example, the actuator rod could be used to actuate the lever of a conventional changemaker to release one or more coins or tokens.

In FIGS. 1, 2, 9 and 10, various pertinent portions of the cart are shown. The wheels of a shopping cart are mounted to a frame 55. The forward wheels are mounted by turnable casters. The cart has a basket 56 and a handle 57. The frame of many conventional carts includes a lower bar 58 which is directly supported by the wheels and will be utilized in this invention by means to limit the upward movement of the cart when it is in a reward-issuing position and to prevent rearward movement (removal) of the cart.

This latter means comprises a unidirectional, non-reversible turnstile 60 which is mounted to the platform. It has a vertical axis of rotation 61 around which a turnstile plate 62 rotates. The turnstile plate cannot be lifted. The plate has a plurality of integral fingers 63 which form slots 64 between them. A conventional ratchet means 65, the details of which need not be shown, is utilized to mount a rotatable turnstile shaft 66 to the platform. Plate 62 is rigidly attached to shaft 66. The fingers extend radially outward from the axis of rotation. Due to the turnstile construction, the fingers cannot be raised up and down. They therefore provide a vertical limitation means to prevent excessive lifting movement of the cart when it is in a reward-issuing position. As can best be seen in FIG. 9, the turnstile plate 62 is disposed with its lower face at an elevation 67 which leaves an increment 68 between the lower surface of the plate (and of the fingers) and of the top of the lower bar 58 of the cart frame which is less than the actuation increment 69 (see FIG. 10) of motion of the reward plunger that is required for the actuation of the reward-issuing means, all as will more fully be described below.

The turnstile is unidirectional in the direction shown by arrow 70 (see FIG. 10). It is non-rotatable in the reverse direction, whereby it will prevent the reverse movement of a cart which has already sufficiently moved a finger in the first direction. It does so by engaging a bend in the lower bar between two fingers. It should be observed that at position the rear wheel 36 is partially trapped between guides 29 and 32, and that the vertical movement of the frame is limited by the turnstile plate so there is very little freedom of movement of wheel 36 when in the position shown in FIG. 3. A person cannot by lifting the cart manipulate the cart to cause the wheel to issue more than one reward because increment 68 is smaller than increment 69.

An unlatching plunger 75 projects upward through an opening in the platform on the path taken by front wheel 33. A reward plunger 76 projects upwardly through the platform in the path of rear wheel 36. A latching plunger 77 projects upwardly through the platform, also along the path of wheel 36 spaced from plunger 76. Therefore, as the cart is passed through the portal, the first of these plungers to be contacted will be the unlatching plunger 75, because the front wheel arrives there first and does not run over plungers 76 and 77. Thereafter, the rear wheel will first strike the reward plunger 76 and thereafter will strike the latching plunger 77 to carry out a sequential actuation yet to be described.

According to a preferred feature of the invention, the upper tip ends 78, 79, 80 of plungers 75, 76 and 77, respectively, are sharpened. These need not necessarily be sharpened to a fine point, but the end area should be reduced to such an area that the finger cannot comfortably press it down against the resistance of the mechanism. This is an important feature in deterring the unauthorized manipulation of the system. It will also be noticed that the unlatching plunger 75 is considerably spaced from the reward plunger 76, such that a person would have to reach around and over the guides and through a cart (if one were in place) in order to try to unlatch the mechanism prior to pressing down the reward plunger. This spacing requires the person to assume a rather exaggerated and obvious position, and the pointed ends of the plungers makes it even more difficult to conduct unauthorized operations, either with or without a cart in place. Further, these mechanisms will usually be placed in general view, even though they might not be inside of a building, and this also tends to discourage unauthorized operation.

FIG. 11 shows a reward plunger 76a which can be used instead of plunger 76. It also has a sharpened tip 79a. Plunger 76a differs from plunger 76 in that it has a bend 76b which causes the point to face partly toward the advancing wheel 36. This enables the point to "dig in" to the tire, and makes it somewhat easier for the cart to depress the reward plunger. For one thing, the cart need not climb up nearly atop this plunger to start its downward movement, as it may have to do with plunger 76. Instead there is more of a camming action, and the reward system is more readily operated. The security of the system is not diminished.

In FIGS. 4, 5, 6 and 7, there are shown means for enabling the plungers to exert their intended effect on the mechanism. Interlinking means 85 is pivotally mouonted to the platform. This interlinking means is mounted to the actuating rod and to the reward plunger by pin joints. Depression of the reward plunger will shift the actuating rod upwardly along its own axis. The interlinking means is a first-class lever turning around a pivot 86 that is in turn mounted to the underside of platform 23. Preferably, arm 87 of interlinking means 85 is longer than arm 88 so that the weight of the actuating rod, which may be a steel rod, provides a very substantial moment in opposition to the depression of the reward plunger, whereby the weight of the actuation rod itself constitutes a return means for the actuating rod and for the reward plunger. The effect of the weight of the actuating rod is amplified. This inherent weight is sometimes referred to as "biasing means causing the actuating rod to oppose the depression of the reward plunger". Of course, spring means or other biasing force means may be substituted for the weight, if desired, but the arrangement shown has the advantage of being very simple. Its effect is also to cause the reward plunger to rise above the platform unless the reward plunger is forcibly depressed.

A plurality of holes 88a is formed in arm 87. By this means, the actuating rod can be mounted at different distances from the pivot 86, thereby providing for a selection of the upward force exerted on the reward plunger.

A latch 90 has an unlatched position as shown in FIG. 6, and a latched position as shown in FIG. 7. Latch 90 includes a plate 91 mounted to a rod 92. As can best be seen in FIGS. 4 and 5, the plate is of a width such that when the plate is in the position of FIGS. 5 and 7, it is interposed between and in contact with arm 87 of interlinking means 85 and the undersurface of the platform, so as to prevent the upward movement of the actuating rod by a distance which would be sufficient to actuate the reward-issuing means (actuation increment 69). In the unlatched position, as shown in FIGS. 4 and 6, the latch is pulled away from a position of interference with arm 87, and the reward plunger and the actuating rod can be actuated. The rod 92 is shifted for this purpose by being mounted to a pair of bell cranks 93, 94. These bell cranks are respectively mounted to pivot blocks 95, 96 which are respectively mounted to the platform. Each of the bell cranks has a pair of interconnected arms so that the arms of each bell crank rotate together. As can be seen in FIG. 4, the unlatching plunger 75 is connected to one arm of bell crank 93, and the rod 92 is connected to the other arm. Latching plunger 77 is connected to one of the arms of bell crank 94, and its other arm is also connected to rod 92. By virtue of this arrangement, depression of unlatching plunger 75 will move the rod and therefore the plate 91 in one direction, and depression of latching plunger 77 will move it in the other direction.

In the condition of FIGS. 5 and 10, as a consequence of rear wheel 36 having passed over latching plunger 77, the turnstile will have permitted the cart to have passed beyond the mechanism, and the mechanism awaits the arrival of the next cart. When the next cart arrives, front wheel 33 will run over unlatching plunger 75. This will cause bell crank 93 to pull rod 92, and therefore plate 91, out of the interfering position of FIG. 5 and into the clearance position of FIGS. 4 and 6. Now the device is ready to issue a reward.

Further movement of the cart along the path will cause the lower bar of the cart to turn the turnstile so that the bar is trapped between two of the fingers, and so it is also held down by the fingers. This is the condition shown in FIGS. 3 and 9. At this time, the reward plunger will have been pressed down, rotating the interlinking means and pressing the actuating rod 53 in an upward direction, where it actuates the reward-issuing means to issue one stamp (or whatever number of stamps has been predetermined to be issued). At this time, it is important to note that the guides 29 and 32 restrain the sideward movement of wheel 36, and the increment of movement 68 permitted to the cart in a vertical direction by the turnstile is less than the actuation increment 69. Therefore, the cart cannot be lifted up and down or shifted sideward sequentially to operate the reward mechanism. The only thing remaining to be done is to pass the cart through the portal, at which time the wheel 36 rolls over latching plunger 77, as shown in FIG. 10. This causes bell crank 94 to rotate and move the latch to the position of FIG. 7 so that a reward cannot again be issued until the unlatching plunger has been pressed.

It will be observed that, once the cart has run over unlatching plunger 75, the cart starts to be in the way of the reward plunger. A person would have to reach in and forcibly press down on the pointed tip of the reward plunger in order to actuate the reward plunger, which would be more painful than the person would ordinarily care to withstand; that is, the required force cannot comfortably be exerted by the bare hand. When the reward plunger is pressed by the wheel 36, the cart cannot be backed away because of the turnstile's restraint. As soon as the cart moves forward far enough to relatch the device, the cart cannot be backed up, both because of the turnstile, and because the unlatching device 75 must be pressed, and it cannot readily be reached because it is under the cart. The device, while not totally foolproof, is sufficiently involved that a person would be deterred from misuse by the inconvenient location of the plungers, by the sequence required for their actuation, and by the rather large unit pressure required to be exerted on the pointed end of the plungers. Such a force can be exerted by a solid rubber tire, but not by the finger. A downward force of about fifteen pounds, which can readily be exerted by the cart through the solid tire, amounts to about 165 pounds per square inch when applied to a point having a circular disc end of about 0.10 inch in diameter, and such a pressure cannot comfortably be exerted by a finger. Therefore, this device, while elegantly simple, is difficult, if not practically impossible, to outwit in any location where it reasonably can be used.

This invention is not to be limited by the embodiment shown in the drawings and described in the description, which is given by way of example and not of limitation, but only in accordance with the scope of the appended claims.

I claim:

1. A mechanism for receiving a cart having a frame and wheels, which mechanism issues a reward as a consequence of the return of such a cart, said mechanism comprising: a platform defining a cart path; an unlatching plunger, a reward plunger and a latching plunger, all passing through and projecting above the platform, each said plunger having an upper end which is movable up and down relative to the platform, each said plunger being disposed in said path so as to be moved as a consequence of contact by a wheel of a cart when the car moves along the path in a first direction of motion, the plungers being so disposed and arranged along the path that, when the cart is in a first unlatching position, a second rewardissuing position, and a third latching position along the path, the unlatching plunger, reward plunger and latching plunger will respectively be moved in that sequence; a unidirectional turnstile having an axis of rotation, said turnstile being rotatable in a first direction around said axis of rotation as a consequence of a cart's movement along the path in said first direction to permit movement of the cart, and nonrotatable in a second direction reverse to the first direction, whereby to prevent the movement of a cart in the second direction which has entered the turnstile, said turnstile having a portion disposed at an elevation above the platform so as to limit the lifting of a cart which is restrained by the turnstile to a vertical movement less than an increment required to actuate the reward plunger when the cart is at the reward-issuing position; an actuating rod movable in an actuating direction and in a return direction; interlinking means pivotally mounted to said platform, and linked to said actuating rod and to said reward plunger, movement of said reward plunger moving the actuating rod in the actuating direction, the actuating rod, interlinking means, and reward plunger together constituting a reward linkage; biasing means biasing the actuating rod in said return direction, and also biasing the reward plunger to a position above the platform, thereby to oppose that movement of said reward plunger which would actuate the actuator rod; a latch having a latched and an unlatched position, said latch, when in its latched position, preventing movement of the reward linkage that enables the actuating rod to move in its actuating direction, and when in its unlatched position, permitting said movement; and latch-actuating linkage connected to the unlatching plunger, to the latching plunger, and to the latch, whereby movement of the unlatching plunger from one position to another moves the latch-actuating linkage to move the latch to the unlatched position, and movement of the latching plunger from one position to another moves the latch-actuating linkage to move the latch to the latched position.

2. A mechanism according to claim 1 in which the interlinking means is a lever.

3. A mechanism according to claim 2 in which said lever is provided with means for attaching the actuating rod thereto at different positions along the length of the lever.

4. A mechanism according to claim 2 in which the said latch in said latched position is interposed between said platform and said lever.

5. A mechanism according to claim 4 in which the biasing means causing the actuating rod to oppose the movement of the reward plunger comprises the weight of the actuating rod.

6. A mechanism according to claim 5 in which said lever is provided with means for attaching the actuating rod thereto at different positions along the length of the lever.

7. A mechanism according to claim 1 in which the area of the tip end of the reward plunger is so related to the biasing force as to require a force to move the reward plunger which cannot comfortably be exerted by the bare hand.

8. A mechanism according to claim 7 in which the interlinking biasing means is a lever, and in which the means causing the actuating rod to oppose the movement of the reward plunger comprises the weight of the actuating rod.

9. A mechanism according to claim 8 in which said lever is provided with means for attaching the actuating rod thereto at different positions along the length of lever.

10. A mechanism according to claim 1 in which the latch-actuating linkage comprises a pair of bell cranks, one connected to the latching plunger and the other to the unlatching plunger, and in which movement of the unlatching plunger as a consequence of a cart's occupation of said unlatching position causes the latch to move out of interfering engagement with the latch-actuating linkage, and in which movement of the latching plunger as a consequence of a cart's occupation of said latching position causes the latch to move into interfering engagement with the latch-actuating linkage.

11. A mechanism according to claim 1 in which the reward plunger has a tip which is bent to point at least partially toward an advancing wheel.

12. A mechanism according to claim 1 in which the unlatching plunger and the reward plunger are laterally spaced relative to one another relative to the cart path.

13. A mechanism according to claim 12 in which guide means is provided for the wheel which contacts the reward plunger, whereby to limit its lateral movement relative to the path when the cart is in said reward-issuing position.

14. A mechanism according to claim 13 in which the area of the tip end of the reward plunger is so related to the biasing force as to require a force to move the reward plunger which cannot comfortably be exerted by the bare hand.

15. A mechanism according to claim 14 in which the biasing means causing the actuating rod to oppose the movement of said reward plunger comprises the weight of the actuating rod.

16. A mechanism according to claim 15 in which said lever is provided with means for attaching the actuating rod thereto at different positions along the length of the lever.

17. A mechanism according to claim 16 in which said latch when in its latched position is interposed between the platform and the lever.

18. A mechanisms according to claim 17 in which the latch-actuating linkage comprises a pair of bell cranks, one connected to the latching plunger and the other to the unlatching plunger, and in which movement of the unlatching plunger as a consequence of a cart's occupation of said unlatching position causes the latch to move out of interfering engagement with the latching-actuating linkage, and in which movement of the latching plunger as a consequence of a cart's occupation of said latching position causes interfering engagement with the latch-actuating linkage.

19. In combination: a mechanism for receiving a cart having a frame and wheels, which mechanism issues a reward as a consequence of the return of such a cart, said mechanism comprising: a platform defining a cart path; an unlatching plunger, a reward plunger and a latching plunger, all passing through and projecting above the platform, each said plunger having an upper end which is movable up and down relative to the platform, each said plunger being disposed in said path so as to be moved as a consequence of contact by a wheel of a cart when the cart moves along the path in a first direction of motion, the plungers being so disposed and arranged along the path that, when the cart is in a first unlatching position, a second reward-issuing position, and a third latching position along the path, the unlatching plunger, reward plunger and latching plunger will respectively be moved in that sequence; a unidirectional turnstile having an axis of rotation, said turnstile being rotatable in a first direction around said axis of rotation as a consequence of a cart's movement along the path in said first direction to permit movement of the cart, and non-rotatable in a second direction reverse to the first direction, whereby to prevent the movement of a cart in the second direction which has entered the turnstile, said turnstile having a portion disposed at an elevation above the platform so as to limit the lifting of a cart which is restrained by the turnstile to a veertical movement less than an increment required to actuate the reward plunger when the cart is at the reward-issuing position; an actuating rod movable in an actuating direction and in a return direction; interlinking means pivotally mounted to said platform, and linked to said actuating rod and to said reward plunger, movement of said reward plunger moving the actuating rod in the actuating direction, the actuating rod, interlinking means, and reward plunger together constituting a reward linkage; biasing means biasing the actuating rod in said return direction, and also biasing the reward plunger to a position above the platform, thereby to oppose that movement of said reward plunger which would actuate the actuator rod; a latch having a latched and an unlatched position, said latch, when in its latched position, preventing movement of the reward linkage that enables the actuating rod to move to its actuating direction, and when in its unlatched position, permitting said movement; latch-actuating linkage connected to the unlatching plunger, to the latching plunger, and to the latch, whereby movement of the unlatching plunger from one position to another moves the latch-actuating linkage to move the latch to the unlatched position, and movement of the latching plunger from one position to another moves the latch-actuating linkage to move the latch to the latched position; and a reward-issuing device linked to the actuating rod arm adapted to issue a reward as a consequence of movement of the actuating rod in the actuating direction.

20. A combination according to claim 19 in which the unlatching plunger and the reward plunger are laterally spaced relative to one another relative to the cart path.

21. A combination according to claim 20 in which guide means is provided for the wheel which contacts the reward plunger, whereby to limit its lateral movement relative to the path when the cart is in said reward-issuing position.

22. A combination according to claim 21 in which the area of the tip end of the reward plunger is so related to the biasing force as to require a force to move the reward plunger which cannot comfortably be exerted by the bare hand.

23. A combination according to claim 19 in which the latch-actuating linkage comprises a pair of bell cranks, one connected to the latching plunger and the other to the unlatching plunger, and in which movement of the unlatching plunger as a consequence of a cart's occupation of said unlatching position causes the latch to move out of interfering engagement with the latch-actuating linkage, and in which movement of the latching plunger as a consequence of a cart's occupation of said latching position causes interfering engagement with the latch-actuating linkage.

* * * * *

UNITED STATES PATENT OFFICE
CERTIFICATE OF CORRECTION

PATENT NO. : 3,897,863
DATED : August 5, 1975
INVENTOR(S) : ALBERT L. PEGGS

It is certified that error appears in the above-identified patent and that said Letters Patent are hereby corrected as shown below:

| | |
|---|---|
| Col. 3, line 61 | between "at" and "position" insert --this-- |
| Col. 4, line 52 | "mouonted" should read --mounted-- |
| Col. 4, line 53 | "mounted" should read --Linked-- |
| Col. 6, line 56 (Cl. 1, line 14) | "rewardissuing" should read --reward-issuing-- |
| Col. 7, line 57 (Cl. 9, line 3) | "of lever" should read --of the lever-- |
| Col. 8, line 30 Cl. 18, line 1) | "mechanisms" should read --mechanism-- |
| Col. 9, line 1 (Cl. 19, line 28) | "veertical" should read --vertical-- |
| Col. 9, line 18 (Cl. 19, line 45) | "to" should read --in-- |

Signed and Sealed this thirtieth Day of March 1976

[SEAL]

Attest:

RUTH C. MASON
Attesting Officer

C. MARSHALL DANN
Commissioner of Patents and Trademarks